(12) United States Patent
Purvis (10) Patent No.: US 10,006,446 B2
(45) Date of Patent: Jun. 26, 2018

(54) ELECTROMAGNETIC SEGMENTED-CAPACITOR PROPULSION SYSTEM

(71) Applicant: James Wayne Purvis, Albuquerque, NM (US)

(72) Inventor: James Wayne Purvis, Albuquerque, NM (US)

( * ) Notice: Subject to any disclaimer, the term of this patent is extended or adjusted under 35 U.S.C. 154(b) by 766 days.

(21) Appl. No.: 14/591,585

(22) Filed: Jan. 7, 2015

(65) Prior Publication Data

US 2016/0197543 A1 Jul. 7, 2016

(51) Int. Cl.
*F03H 99/00* (2009.01)
*H02K 53/00* (2006.01)

(52) U.S. Cl.
CPC .............. *F03H 99/00* (2013.01); *H02K 53/00* (2013.01)

(58) Field of Classification Search
CPC .......... F03H 1/0037; F03H 3/00; F03H 99/00; H01F 7/066
USPC .................................................. 335/223–226
See application file for complete search history.

(56) References Cited

U.S. PATENT DOCUMENTS

| | | |
|---|---|---|
| 2,949,550 A | 8/1960 | Brown |
| 2,958,790 A | 11/1960 | Bahnson |
| 3,018,394 A | 1/1962 | Brown |
| 3,187,206 A | 6/1965 | Brown |
| 3,223,038 A | 12/1965 | Bahnson |
| 3,227,901 A | 1/1966 | Bahnson |
| 3,626,605 A | 12/1971 | Wallace |
| 4,891,600 A | 1/1990 | Cox |
| 5,142,861 A | 9/1992 | Schlicher et al. |
| 5,182,958 A | 2/1993 | Black |
| 5,197,279 A | 3/1993 | Taylor |
| 5,207,760 A | 5/1993 | Dailey et al. |
| 5,280,864 A | 1/1994 | Woodward |
| 5,377,936 A | 1/1995 | Mitchell |
| 2,886,976 A | 5/1995 | Dean |
| 6,098,924 A | 8/2000 | Woodward |
| 6,317,310 B1 | 11/2001 | Campbell |
| 6,347,766 B1 | 2/2002 | Woodward |
| 6,411,493 B2 | 6/2002 | Campbell |

(Continued)

FOREIGN PATENT DOCUMENTS

| | | |
|---|---|---|
| GB | 2229865 | 10/1990 |
| GB | 2334761 | 9/1999 |

(Continued)

OTHER PUBLICATIONS

Powell "Did NASA Validate an Impossible Space Drive In a Word, No" 2015.*

(Continued)

*Primary Examiner* — Gerald L Sung
*Assistant Examiner* — William Breazeal (57) ABSTRACT

The present invention is a spacecraft electromagnetic propulsion system which provides thrust without expelling propellant. The system includes a multi-element capacitor with rotating segmented cathodes, and electromagnetic coils for generating magnetic fields. Interactions between the electromagnetic fields and the rotating charged capacitor elements produce unidirectional forces, while reaction momentum is carried away by the Poynting Vector fields in conformity with the currently understood principles of modern physics.

11 Claims, 5 Drawing Sheets

(56) References Cited

U.S. PATENT DOCUMENTS

| | | | |
|---|---|---|---|
| 6,492,784 | B1 | 12/2002 | Serrano |
| 6,775,123 | B1 | 8/2004 | Campbell |
| 7,913,954 | B2 | 3/2011 | Levin |
| 8,066,226 | B2 | 11/2011 | Fiala et al. |
| 8,575,790 | B1 | 11/2013 | Ogilvie |
| 2014/0013724 | A1 | 1/2014 | Fetta |
| 2014/0265688 | A1* | 9/2014 | Post .................. H02K 7/09 310/90.5 |

FOREIGN PATENT DOCUMENTS

| | | |
|---|---|---|
| GB | 2399601 | 9/2004 |
| GB | 2537119 | 10/2016 |

OTHER PUBLICATIONS

Stafford, Thomas P., "America at the Threshold: Report of the Synthesis Group on America's Space Ezploration Initiative", 1991, NASA.

NASA, "Breakthrough Propellantless Propulsion, Workshop Proceedings", Glenn Research Center, 1997.

Shawyer, Roger, "A Theory of Microwave Propulsion for Spacecraft (Theory Paper v9.3)", New Scientist, Sep. 2006.

Hambling, David, "EmDrive: China's radical new space drive", Technology, Feb. 6, 2013.

Hambling, David, "NASA validates 'impossible' space drive", http://www.wired.co.uk, Jul. 31, 2014.

Feynman Richard P., et.al., "The Feynman Lectures on Physics", vol. II, 1997.

Tipler, Paul A., "Physics for Scientists and Engineers", Fourth Edition, 1999.

Cullwick, E..G, Electromagnetic Momentum and Newton's Third Law, Nature, 170-425, 1952.

Maimon, Ron, http://physics.stackexchange.com/questions/43269/violation-of-newtons-3rd-law-and-momentum-conservation, Nov. 2, 2012.

Stafford, Thomas P., "America at the Threshold: Report of the Synthesis Group on America's Space Exploration Initiative",1991, pp. 64-68,NASA.

NASA, "Breakthrough Propulsion Project, Workshop Proceedings", NASA TM/1998-208400, pp. 4-9,1998.

Resnick, D., and Halliday, R., "Physics, Parts I and II", pp. 986, 995-998., John Wiley & Sons, 1967.

Sebens, C.T., "Forces on Fields", arXiv:1707.04198 [physics.hist-ph], pp. 1-21, 2017.

Cullwick, E.G., Nature, vol. 470, No. 125, 1952.

White, Harold et.al.,AIAA Journal of Propulsion and Power, vol. 33, No. 4, pp. 830-841.

Feynman, R.P., et.al.,The Feynman Lectures on Physics, vol. II, Ch. 26-2, 1997.

* cited by examiner

ELECTROMAGNETIC SEGMENTED-CAPACITOR PROPULSION SYSTEM

FIELD OF THE INVENTION

This invention relates generally to the field of spacecraft propulsion. More specifically, the invention relates to electromagnetic spacecraft propulsion systems which provide thrust without expelling propellant.

BACKGROUND OF THE INVENTION

One of the most significant metrics for space propulsion systems is specific impulse, which is the ratio of thrust produced to the rate of propellant consumed. Specific impulse has units of seconds, and is essentially the number of seconds that a pound of propellant will produce a pound of thrust. The higher the specific impulse the less propellant mass and associated tankage required for a given space mission. The Stafford Synthesis Group (Stafford, *America at the Threshold*) concluded that future space exploration will require advanced propulsion technologies. Subsequently, NASA conducted the *Breakthrough Propulsion Physics Program* (NASA/TM-1998-208400), one of the three main goals of which was to "discover new propulsion methods that eliminate or dramatically reduce the need for propellant. This implies discovering fundamentally new ways to create motion, presumably by manipulating inertia, gravity, or by any other interactions between matter, fields, and space-time." Therefore, an electromagnetic spacecraft propulsion system such as the present invention, that does not require expendable propellant and thus has an effectively infinite specific impulse, would address these needs and greatly reduce the cost of doing business in space.

Sir Isaac Newton's well-known Third Law of Motion, which states "To every action there is always an opposed equal reaction; or, the mutual actions of two bodies upon each other are always equal and directed to contrary parts", has been interpreted as all-encompassing for over three hundred years. The Newtonian interpretation excluded the possibility of "reactionless propulsion" of a solid body. However, the discovery of electricity and magnetism, the new branch of electrodynamics resulting from Maxwell's Equations, and the subsequent rise of relativistic electrodynamics and quantum electrodynamics, led to a new interpretation of the famous "Third Law of Motion".

One of the important characteristics of an electromagnetic (EM) wave is that it can transport energy from point to point. The rate of energy flow per unit area in a plane electromagnetic wave is described by the Poynting Vector S, defined as the cross-product of the instantaneous E-field and B-field comprising the EM wave. The direction of S gives the direction in which the energy moves. (Resnick and Halliday, *Physics Parts I and II*). Less familiar is the fact that EM waves also transport linear momentum. Just as Poincare noted in 1900, Stebens explains that the electromagnetic field closely resembles a relativistic fluid, composed of quantum, particles (photons), which transmits properties and responds to forces in much the same way as an Eulerian fluid (Stebens, *Forces on Fields*). In electromagnetism, as in Newton's solid body mechanics, the force on matter from the electromagnetic field is balanced by an equal and opposite force from matter on the field. Stebens presents an excellent proof which can be derived from Maxwell's equations and the Lorentz force law. The proof relates the reaction momentum change of the electromagnetic field to the time rate of change of the Poynting Vector, the divergence of the Maxwell Stress Tensor, and Einstein's relativistic mass-energy relation (*Forces and Fields*, op. cit.). By recognizing that electromagnetic fields can transport both energy and momentum, apparent "violations" of the Third Law are mathematically resolved by including modern field transport physics in the analysis of the reaction process.

Field propulsion, which employs electromagnetic field effects for generating propulsion forces, expels no reaction mass, and therefore effectively has an infinite specific impulse. As is well known to anyone skilled in the art, a moving charged particle generates a magnetic field. It is also well known that a magnetic field generates a force on a moving charged particle, namely the magnetic component of the full Lorentz Force, which component is proportional to the vector cross-product of the particle velocity vector and the magnetic field vector at the particle location. A common example is the well-known mutual equal-and-opposite forces on parallel conductors, which may be calculated by anyone skilled in the art through the use of the Biot-Savart Law. Prior to modern electrodynamics, the required compliance with Newton's Third Law (NTL), it has previously been accepted that the aforementioned magnetic interactions could not be used to produce a propellantless propulsion system. As discussed above, modern electrodynamics has shown that this is no longer a valid assumption.

Physicists have known since at least 1952 that apparent violations of NTL, in cases where force interactions involve charged particles and electromagnetic fields, simply do not account for the momentum carried in the fields themselves. As noted by Cullwick over sixty years ago: "The following simple relations between electromagnetic momentum, the Poynting vector for energy transport, and mass-energy equivalence do not appear to have received general recognition in connection with the validity of Newton's Third Law when applied to electromagnetic forces (Cullwick, *Nature*)." Since then, over thirty US patents and at least two dozen foreign patents have been issued for propellantless propulsion devices. Most importantly, recent experimental investigations conducted by NASA with an EM drive device (White, *AIAA Journal of Propulsion and Power*) have definitively confirmed that EM field propulsion is a reality.

Nobel Laureate Richard Feynman (*The Feynman Lectures on Physics*), among others, noted that the magnetic interaction between two charged particles moving orthogonally to each other apparently does not satisfy NTL in classical Newtonian dynamics. But, as discussed above, if the changing momentum of the electromagnetic fields of the two particles is included, then overall momentum is conserved. Engineering exploitation of this situation, to date, has not been effected due to the "circuit completion" problem. While isolated moving charges may apparently violate NTL, when they are considered as part of a complete closed circuit by application of Gauss' Law, the net forces on each circuit are found to be equal and opposite in accordance with NTL.

Prior Art for Electromagnetic Propulsion

The electrokinetic phenomenon known in the scientific literature as the Biefeld-Brown Effect, wherein electrical energy input into asymmetrical capacitors can be converted to mechanical energy, provides a reactionless force for propelling an object. T. T. Brown, a co-discoverer of the Biefeld-Brown Effect, has been issued U.S. Pat. No. 2,949,550, U.S. Pat. No. 3,018,394, and U.S. Pat. No. 3,187,206 for devices based on utilization of the effect. Townsend's colleague A. H. Bahnson has similarly been issued U.S. Pat. No. 2,958,790 U.S. Pat. No. 3,223,038, and U.S. Pat. No. 3,227,901 utilizing the effect. NASA is still experimentally investigating the use of Brown's discovery, as disclosed in U.S. Pat. No. 6,317,310, U.S. Pat. No. 6,411,493, and U.S. Pat. No. 6,775,123 to Campbell (assigned to NASA). Another such device is disclosed in U.S. Pat. No. 6,492,784 to Serrano, which generates the Biefeld-Brown Effect using stacked-disc asymmetrical capacitors, and which has just been approved for spaceflight testing. Debate is ongoing in the literature as to whether the Biefeld-Brown Effect will work in the vacuum of space. Another limiting consideration for using the effect may be the scalability potential, since asymmetrical capacitor devices to date have only generated tens of milli-newtons of thrust from tens of watts of input power.

Electrodynamic structures, as disclosed in U.S. Pat. No. 7,913,954 to Levin, include a power system, a plurality of collectors, a plurality of emitters, and conductive paths for moving payloads through the Earth's magnetic field. The inertial propulsion device disclosed in U.S. Pat. No. 8,066,226 to Fiala utilizes several interconnected gyroscopic elements within Earth's gravity field to move without propellant. U.S. Pat. No. 5,377,936 to Mitchell, discloses a method for using the electromagnetic spectrum particles which continually irradiate the earth from space for gravity guidance and propulsion of geosynchronous satellites, and other satellites and space vehicles within the gravitational influence of the earth. The superconducting electromagnetic turbine, as disclosed in U.S. Pat. No. 8,575,790 to Ogilvie, uses a pair of counter-rotating electrodynamic superconductor rotors to displace the surrounding geomagnetic field. These devices do not have general space-based utility because they are restricted to operations within either the gravity field or the magnetic field of Earth.

Other approaches to propellantless propulsion include mechanical devices such as U.S. Pat. No. 2,886,976 to Dean, which discloses a device for converting rotary motion into unidirectional motion. Similarly, U.S. Pat. No. 5,182,958 to Black discloses a mechanical device with wheels inside comprising both a nonlinear propulsion as well as an energy conversion system. A device for propellantless propulsion using radiated electromagnetic fields is disclosed in U.S. Pat. No. 5,142,861 to Schlicher et al., comprising an electromagnetic propulsion system based on an extremely low frequency radiating antenna structure driven by a matched high current pulsed power supply. U.S. Pat. No. 5,197,279 to Taylor also discloses an engine for imparting momentum to a vehicle by generating and transmitting in predetermined directions massive quantities of electromagnetic field energy in successive pulses.

Field modification approaches to propellantless propulsion include apparent reductions in gravitational mass or inertial mass. U.S. Pat. No. 3,626,605 to Wallace discloses a method and apparatus for generating a time-variant non-electromagnetic force field due to the relative motion of moving bodies constituted of elements whose nuclei have half integral "spin" values, with said force field exhibiting itself in the form of an induced secondary gravitational force. U.S. Pat. No. 5,280,864 to Woodward discloses a method for producing transient fluctuations in the inertial masses of material objects by employing an effect that is a consequence of relativistic theories of gravitation. Applying pulsed thrust synchronously with the mass fluctuations thus produced facilitate the transport of massive objects. Also to Woodward, both U.S. Pat. No. 6,098,924 and U.S. Pat. No. 6,347,766 disclose inventions for producing propellantless thrust by using piezoelectric force transducers attached to resonant mechanical structures, in accordance with Mach's principle and local Lorentz-invariance predictions of transient rest mass fluctuations in accelerated objects.

The most current example of a propellantless field propulsion system is an electromagnetic drive system as disclosed in British Patents GB2229865, GB2334761, GB2399601 and UK Patent Application GB2537119 to Shawyer, as well as U.S. Pat. Appl. No. 20140013724 to Fetta. This system includes an axially-asymmetric resonant cavity with a conductive inner surface adapted to support a standing electromagnetic (EM) wave. The internal standing EM wave induces a unidirectional force on the resonant cavity, thus generating thrust without reaction mass. Experimental versions of these EM devices have produced thrust levels of micro-newtons up to milli-newtons from several kilowatts of input power (*AMA Journal of Propulsion and Power*, op. cit.)

SUMMARY OF THE INVENTION

The current disclosure presents a novel electromagnetic spacecraft propulsion system which does not expell propellant and requires only electrical power. The basic elements of the invention are a segmented capacitor cathode, an anode with a dielectric, and electromagnetic coils. The charged cathode segments are rotated through electric fields from the electromagnetic coils in such a manner as to produce a unidirectional Lorentz Force on the coil-cathode system. Thus electric power is used to generate momentum on the system through the electromagnetic production of a unidirectional Lorentz Force, while reaction momentum is carried away by the Poynting Vector fields in conformity with the currently understood principles of modern physics.

The current invention is capable of producing continuously variable thrust, including reverse thrust, torques, and lateral forces. Embodiments of the present invention are novel in that thrust is generated in a manner distinct from the devices and methods of Brown, Campbell, Serrano, Shawyer, Fetta, and others as mentioned above. Engineering calculations indicate that the present invention is a significant improvement in thrust level with several orders of magnitude less power consumption as compared to other such propulsion devices. No evidence has been found in the literature of any device designed to take advantage of the electromagnetic field effect as herein described for the present invention.

BRIEF DESCRIPTION OF THE DRAWINGS

The accompanying drawings, which are incorporated in and form part of the specification, illustrate various principles of operation and examples of the best mode of the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
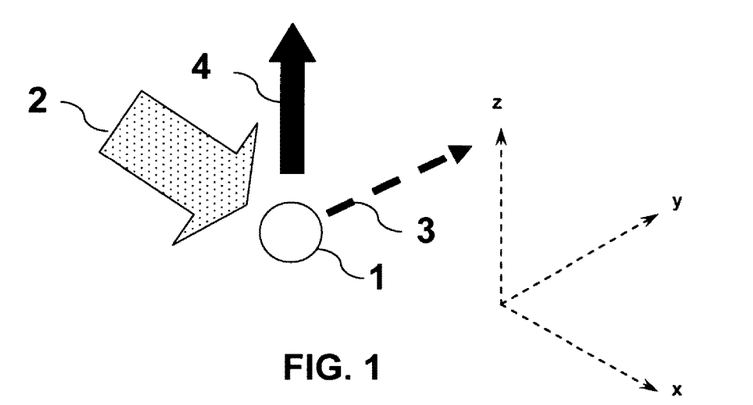
FIG. 1 is a schematic diagram illustrating the Lorentz Force acting on a charged particle moving through a magnetic field.

By way of background, and with reference initially to FIG. 1, it is well known to those skilled in the art that a charged particle 1, with velocity vector 3 parallel to the x-axis as shown, moving through magnetic field 2 which is parallel to the y-axis, will experience a Lorentz Force component 4, parallel to the z-axis, as determined by the sign of the particle charge and the vector cross-product of the velocity vector and the magnetic field vector. The necessary equations to calculate the force magnitude and direction are well known in the current physics literature.

Figure 2:
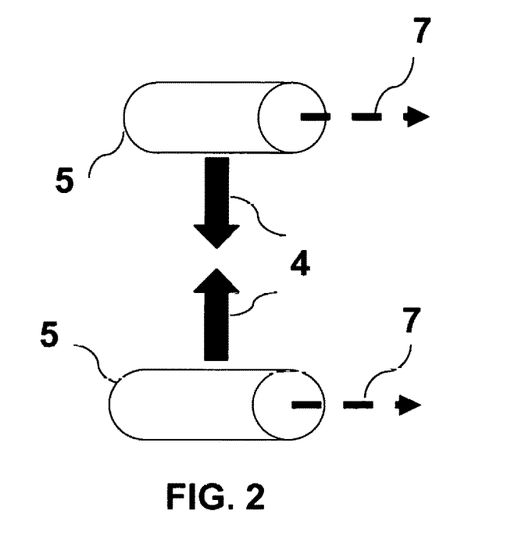
FIG. 2 is a schematic diagram illustrating the mutual Lorentz Forces acting on segments of parallel conductors.

By way of further background, and with reference to FIG. 2, it is also well known to those skilled in the art that segments of two parallel conductors 5 each carrying a current 7 will experience equal and opposite Lorentz Forces 4 as shown. The forces will be attractive if the currents are in the same direction, otherwise the forces will be repulsive. The necessary equations to calculate the force magnitude per unit length of conductor are well known in the current physics literature.

Figure 3:
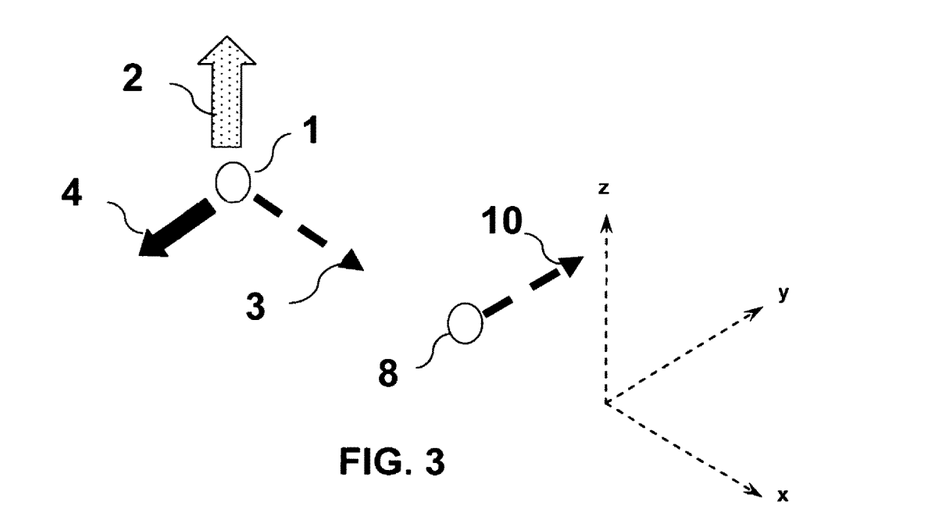
FIG. 3 is a schematic diagram illustrating the unidirectional Lorentz Force acting on two charged particles moving orthogonally in the same plane.

By way of further background, the situation presented in FIG. 3 is also well known to those skilled in the art and familiar with the works of Feynman and Tipler. The figure illustrates two positively charged coplanar particles 1 and 8 moving with respective orthogonal velocities 3 and 10, with velocity vector 10 being parallel to the y-axis and velocity vector 3 being parallel to the x-axis of the indicated coordinate system. At the instant shown, particle 8 induces a magnetic field 2 on particle 1, while particle 1 induces no magnetic field effect on particle 8. As a result, a Lorentz Force component 4 acts on particle 1, while no reaction force acts on particle 8. This situation has been well-studied in the literature, both as an apparent violation of Newton's Third Law (e.g. Cullick, Maimon) and as a potential for devising a propellantless propulsion device. However, experimental attempts to date have the charged particles confined in conductors as part of continuous current loops, and consequently when all forces are properly accounted for on the continuous current loops, no net unidirectional system force is produced on the system. Thus to date no propellantless propulsion device has been developed exploiting this situation.

Figure 4:
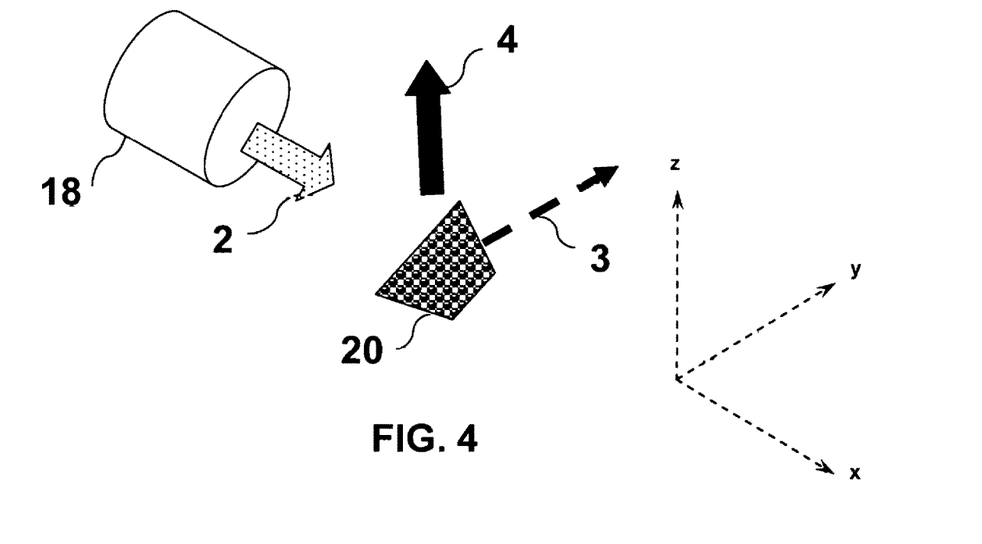
FIG. 4 is a schematic diagram illustrating the unidirectional Lorentz Force induced by an electromagnetic field on a group of charges attached to a moving conducting plate.

It is the genius innovation of the present invention that exploits the situation of FIG. 3 by physically engineering an actual current segment that is not part of a continuous current loop. With reference to FIG. 4, an electromagnetic coil 18 is positioned such that the axis of symmetry of the coil is in the direction of the y-axis of the coordinate system shown. When energized with a current, the electromagnetic coil 18 produces a magnetic field 2 with strongest vector field component along the x-axis, which is the axis of symmetry of the electromagnetic coil 18. A negatively charged plate 20 is moved with velocity 3 in the y-direction such that it passes through the axis of symmetry of the electromagnetic coil 18 as shown. At the appropriate time during which the charged plate 20 is aligned with the axis-of-symmetry of the electromagnetic coil 18, the electromagnetic coil 18 is energized to produce magnetic field 2, which results in a net Lorentz Force component 4 on the system comprised of the electromagnetic coil 18 and the charged plate 20. This net unidirectional Lorentz Force 4 arises from the fact that most individual electrons comprising the current moving in the conducting coils of the electromagnetic coil 18 have z-axis velocity components which are orthogonal to the y-axis velocities 3 of each charge bound to the charged plate 20. For each electromagnetic coil-charged plate electron pair wherein a z-axis velocity component exists, the electrodynamic situation of FIG. 3 is realized. Because the charges on the charged plate 20 are a discrete packet and are not part of a continuous current loop, there is thus a net unidirectional Lorentz Force realized on the system comprised of the electromagnetic coil 18 and the charged plate 20. Comprehensive engineering calculations have verified that a net force is produced on the said coil-plate system, while reaction momentum is carried away by the Poynting Vector fields in conformity with the currently understood principles of modern physics.

Figure 5:
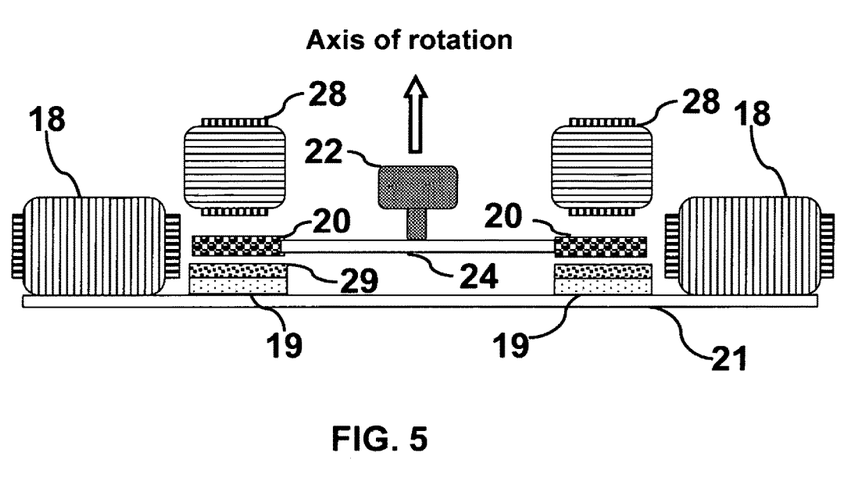
FIG. 5 is a cross-section side view schematic diagram illustrating the elements of the best mode of the present invention.

FIG. 5 presents a side section view of the elements of the best mode of the present invention in which two parallel non-conductive surfaces 21 and 24 form the structural basis of a capacitor assembly. For the purpose of nomenclature hereinafter, the naming convention for the charged parts of a capacitor assembly will follow that used for polarized capacitors, i.e., any negatively charged part of a capacitor assembly will be referred to as a cathode, and any positively charged part of a capacitor assembly will be referred to as an anode. The upper surface 24, which forms the basis of the rotating cathode of the capacitor assembly, is rigidly attached to the means of rotation 22. It is well-known to those skilled in the art that the usual means of rotation for components on spacecraft are electric motors designed for operation in the space environment. The lower surface 21 forms the basis of the non-rotating anode of the capacitor assembly and also serves as both the static mount for multiple elements of the device as well as a structural base for attaching the propulsion system to a spacecraft.

A plurality of negatively charged conductive capacitor plates 20 are attached to the circumference of the disc 24, so as to form collectively the rotating cathode of the capacitor assembly. A plurality of positively charged conductive capacitor plates 19, each having a surface coating of dielectric material 29, are attached to the surface 21, so as to form collectively the stationary anode of the capacitor assembly. The function of the anode and cathode is to maintain a separation of positive and negative charge, as in the usual function of capacitors, but in a configuration such that the charged cathode can be rotated relative to the anode.

A plurality of electromagnetic coils 18 and 28 are rigidly attached to the surface 21. The function of the electromagnetic coils 18 and 28 is to generate magnetic fields which interact with the charges on conductive capacitor plates 20. The electromagnetic coils 18 are positioned radially out from and circumferentially aligned with the conductive capacitor plates 19. The electromagnetic coils 18 are further positioned so as to radially direct a generated magnetic field onto the charged conductive capacitor plates 20 when said plates 20 rotate to a position just above the oppositely charged conductive capacitor plates 19 during operation of the device. The electromagnetic coils 28 are positioned radially out from and circumferentially aligned above the conductive capacitor plates 19. The function of the electromagnetic coils 28 is to direct a generated magnetic field parallel to the axis of rotation onto the conductive capacitor plates 20 when said plates 20 rotate to a position just above conductive capacitor plates 19 during operation of the device.

It is well-known to those skilled in the art that electrical power for spacecraft components is provided from a standardized spacecraft power bus, which is in turn supplied by any electricity source commonly used on spacecraft, such as space-qualified batteries, advanced storage capacitors, solar panels, radioisotopic thermal generators, or any combination thereof. Spacecraft integration specialists design the electrical power connections for operation of specific components such as electromagnetic coils, motors, and capacitor charging systems. Propulsion system thrust profiles for spacecraft, which are both payload and mission dependent, include thrust level variations, thrust durations and thrust directions during a specific mission. It is therefore assumed hereinafter that a spacecraft propulsion system engineer will design the appropriate electric power system, to include on/off power switching, power levels, and power polarity, for desired operation of the present invention.

Figure 6A:
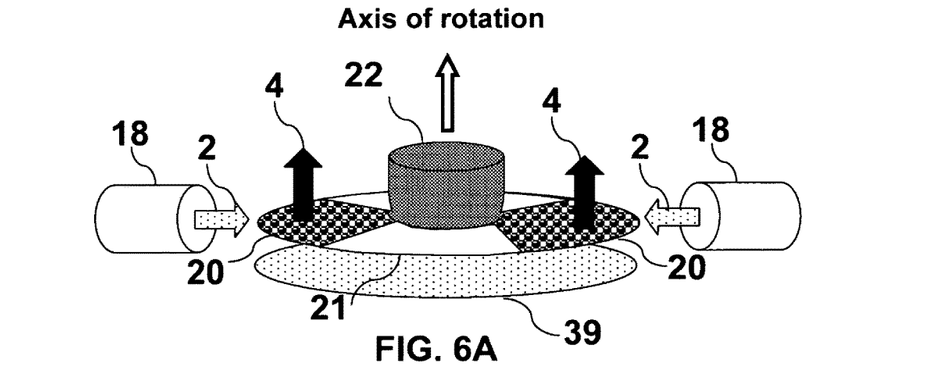
FIGS. 6A and 6B present schematic diagram perspective views illustrating the production of axial forces.
Figure 6B:
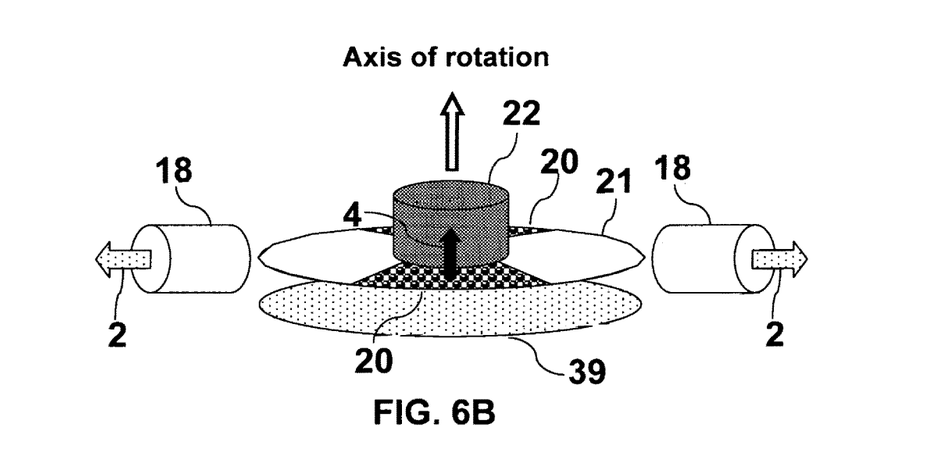

FIGS. 6A and 6B illustrate the use of the best mode embodiment of the present invention to generate an axially directed propulsive force. For clarity, only the minimum necessary components from FIG. 5 are shown. With reference to FIG. 6A, charged cathode plates 20, which are attached to non-conductive disc 24, are rotated by means 22. Oppositely charged anode plates 19, dielectrics 29, and non-conductive surface 21 are shown represented as the single composite disc element 39 solely for clarity of illustration. The composite disc element 39 and magnetic coils 18 are stationary. As cathode plates 20 rotate to a position aligned with the axes of symmetry of coils 18, the coils are energized so as to produce magnetic fields 2 with the polarities as shown. The interaction of the magnetic fields 2 with the rotating charges on cathode plates 20 produces the unidirectional Lorentz Force components 4. With reference to FIG. 6B, as the charged cathode plates 20 are further rotated out of radial alignment with the axes of coils 18, the current in coils 18 is reversed. This reverses the polarity of the generated magnetic fields 2. At the non-aligned location of cathode plates 20, the components of fields 2 are of lower strength but are still directed radially inward. The interaction of the these components of the magnetic fields 2 with the rotating charges on cathode plates 20 produce the reduced unidirectional Lorentz Force components 4. The net effect during one complete cycle of rotation is a continuous unidirectional Lorentz Force on the system in the direction of the axis of rotation.

Figure 7:
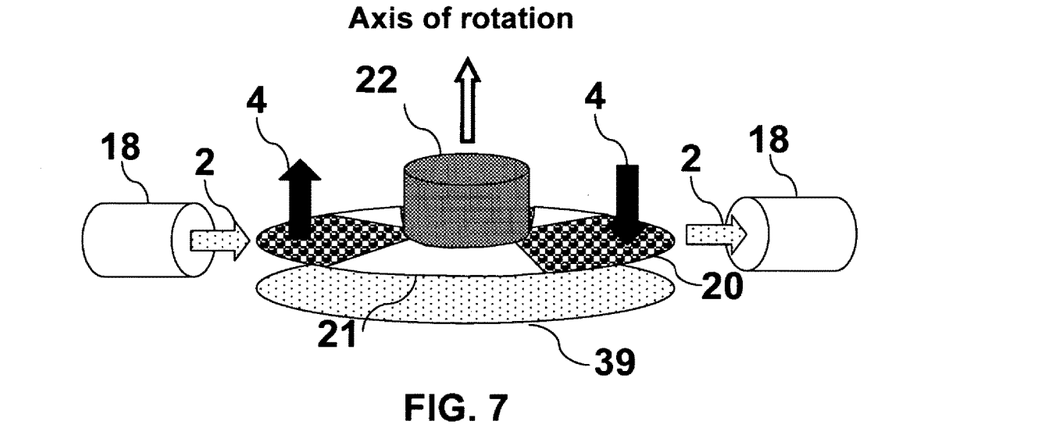
FIG. 7 is a schematic diagram illustrating the production of a torque.

With reference to FIG. 7, charged cathode plates 20, which are attached to non-conductive disc 21, are rotated by means 22. Oppositely charged anode plates 19, dielectrics 29, and non-conductive surface 21 are shown represented as the single composite disc element 39 solely for clarity of illustration. The composite disc element 39 and magnetic coils 18 are stationary. As cathode plates 20 rotate to a position aligned with the axes of symmetry of coils 18, the coils are energized so as to produce magnetic fields 2 with the polarities as shown, in which opposing coils 18 have polarities reversed with respect to each other. The interaction of the magnetic fields 2 with the rotating charges on cathode plates 20 produces the unidirectional Lorentz Force components 4. This reversal of the polarity of the generated magnetic fields 2 causes the generated Lorentz Forces 4 to act in opposite directions, thus causing no net unidirectional force on the system but producing a torque on the system perpendicular to the axis of rotation.

Figure 8:
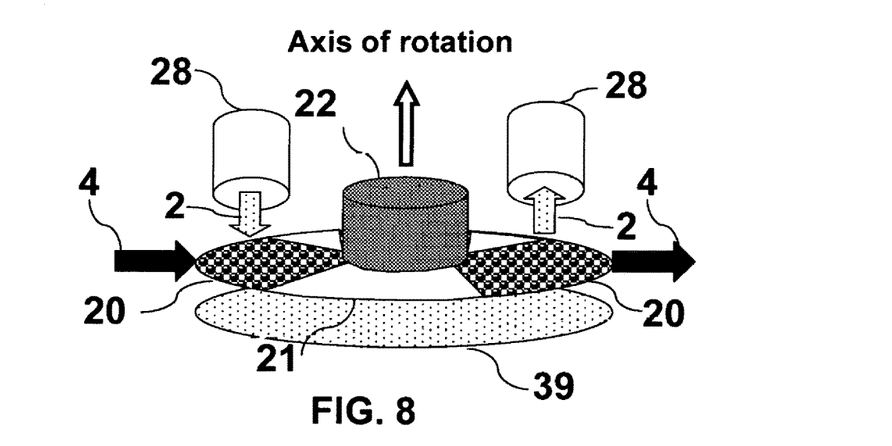
FIG. 8 is a schematic diagram illustrating the production of a lateral translation force.

With reference to FIG. 8, charged cathode plates 20, which are attached to non-conductive disc 21, are rotated by means 22. Oppositely charged anode plates 19, dielectrics 29, and non-conductive surface 21 are shown represented as the single composite disc element 39 solely for clarity of illustration. The composite disc element 39 and magnetic coils 28 are stationary. As cathode plates 20 rotate to a position aligned with the axes of symmetry of coils 28, the coils are energized so as to produce magnetic fields 2 with the polarities as shown, in which the coils 28 have polarities reversed with respect to each other. The interaction of the magnetic fields 2 with the rotating charges on cathode plates 20 produce the unidirectional Lorentz Force components 4 acting in the plane of rotation of the cathode plates 20. The sum of the generated Lorentz Forces 4 results in a net unidirectional translation force on the system which is perpendicular to the axis of rotation.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electromagnetic spacecraft propulsion system comprising:
    a capacitor of two or more parts having charged conductive elements;
    a means for rotating parts of the capacitor, wherein said means for rotating sets said charged conductive elements in motion;
    at least two electromagnetic coils for generating magnetic fields;
    wherein the charged conductive elements and the at least two electromagnetic coils are arranged in certain geometric configurations whereby a net unidirectional Lorentz force is created by an action of the magnetic fields generated by the at least two electromagnetic coils on the charged conductive elements in motion.

2. The electromagnetic spacecraft propulsion system according to claim 1, wherein each part of the capacitor consists of an insulator carrying one or more separate charged conductive elements.

3. The electromagnetic spacecraft propulsion system according to claim 2, wherein one or more of the separate charged conductive elements have a dielectric coating.

4. The electromagnetic spacecraft propulsion system according to claim 1, wherein the separate charged conductive elements of the capacitor are each charged to a desired voltage and polarity.

5. The electromagnetic spacecraft propulsion system according to claim 1, wherein one or more parts of the capacitor are rotated about an axis of symmetry with respect to other static parts of the capacitor.

6. The electromagnetic spacecraft propulsion system according to claim 1, wherein one or more parts of the capacitor are counter-rotated about an axis of symmetry with respect to other rotating parts of the capacitor.

7. The electromagnetic spacecraft propulsion system according to claim 1, wherein two or more of the at least two electromagnetic coils are positioned circumferentially around a rotational axis of symmetry capacitor.

8. The electromagnetic spacecraft propulsion system according to claim 1, wherein magnetic fields of desired polarity, intensity and duration are generated from the at least two electromagnetic coils.

9. The electromagnetic spacecraft propulsion system according to claim 1, wherein the net unidirectional Lorentz force is generated parallel to an axis of rotation of the capacitor.

10. The electromagnetic spacecraft propulsion system according to claim 1, wherein the net unidirectional Lorentz force is generated perpendicular to an axis of rotation of the capacitor.

11. The electromagnetic spacecraft propulsion system according to claim 1, wherein the net unidirectional Lorentz force is a torque on the electromagnetic spacecraft propulsion system, and wherein the torque is perpendicular to an axis of rotation of the capacitor.

* * * * *